United States Patent

[11] 3,589,043

| [72] | Inventor | Jeshavahu Klein<br>5153 Durocher St., Montreal, Quebec, Canada |
|---|---|---|
| [21] | Appl. No | 777,711 |
| [22] | Filed | Nov. 21, 1968 |
| [45] | Patented | June 29, 1971 |

[54] PORTABLE VIEWER FOR MICROFILM
3 Claims, 6 Drawing Figs.

[52] U.S. Cl............................................................ 40/95,
40/89, 242/712, 242/200, 352/78
[51] Int. Cl........................................................ G09f 11/24
[50] Field of Search......................................... 40/86, 87,
88, 93, 94, 95, 89, 90; 242/712, 199, 200; 352/78

[56] References Cited
UNITED STATES PATENTS

| 636,715 | 11/1899 | Casler | 242/199 |
| 1,548,208 | 8/1925 | Reisiger | 40/86 |
| 2,601,733 | 7/1952 | Durey | 40/86 |
| 2,764,826 | 10/1956 | Fulton et al. | 40/86 |
| 3,280,491 | 10/1966 | Klein | 40/86 A |
| 3,379,108 | 4/1968 | Beyer et al. | 352/78 |

*Primary Examiner*—Robert W. Michell
*Assistant Examiner*—L. R. Oremland
*Attorney*—Pierre Lesperance ABSTRACT: A viewer for microfilm specifically adapted for hand operation, wherein a handwheel is rotated to control and actuate the film wind and unwind operations. A gear is fixed to the end of the handwheel axle for movement therewith and engagement with gears provided on the cassette such as to rotate the spools therein in the desired direction to selectively wind and unwind the microfilm on the spools.

PATENTED JUN29 1971 3,589,043
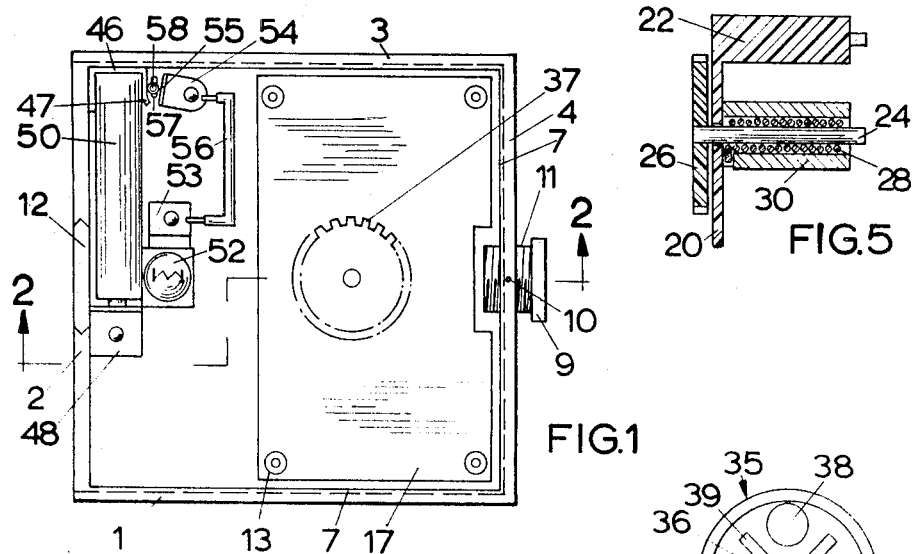
FIG.1
FIG.5
FIG.6
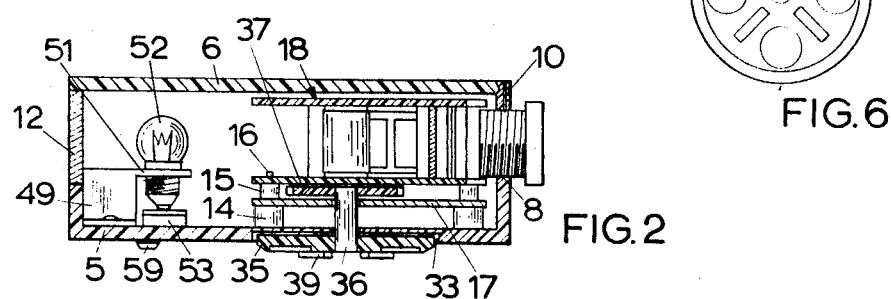
FIG.2
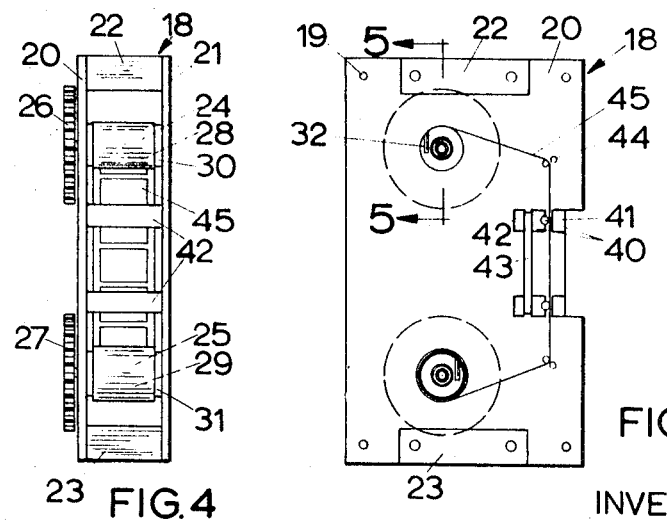
FIG.4 FIG.3
INVENTOR
JESHAYAHU KLEIN
BY Pierre Lespond
AGENT

PORTABLE VIEWER FOR MICROFILM

The present invention relates to a viewer for viewing visual data carried on a film, particularly a microfilm. More particularly, this invention relates to a portable microfilm viewer specifically adapted for hand operation.

The use of films, and particularly microfilms, to record information for future use, is gaining widespread acceptance. Various types of viewers have been designed in trying to meet the needs of all prospective users.

It is a main object of this invention to provide a portable type viewer which is inexpensive, easy to operate and of reliable operation.

The invention is therefore directed to a portable type viewer wherein the film is driven manually by hand actuation of a knob element.

A preferred embodiment of the invention is illustrated by way of example in the accompanying drawings, wherein:

FIG. 1 is a side elevation cross-sectional view of the viewer with the film removed;

FIG. 2 is a cross section, as seen in the direction of the arrows, on line 2–2 of FIG. 1;

FIG. 3 is a side view of a film holder or cassette with one side removed to show the internal arrangement;

FIG. 4 is a left end side view of FIG. 3;

FIG. 5 is a cross-sectional view along line 5–5 of FIG. 3; and

FIG. 6 is a front view of the hand-operated knob element.

Referring now to the drawings wherein like elements are identified by the same reference numerals, the portable viewer comprises a casing having bottom wall 1, rear wall 2, top wall 3, front wall 4 and sidewalls 5 and 6.

It is obvious that the portable viewer illustrated can be held in other positions than the one adapted in this description, in which cases, the walls of the casing would be named accordingly. Side 6 is removably mounted by any well known means. For example, in the embodiment illustrated, sidewall 6 is dovetailed in order to be slidably retained in a matching groove 7 provided adjacent the cooperating edge of the bottom wall 1, top wall 3 and front wall 4 at one side thereof. Front wall 4 is apertured at 8 to receive an optical eyepiece element 9. A pin 10, such as of metal, is inserted through sidewall 6 and front wall 4 and is adapted to project a short distance inside the opening 8 in order to engage a threaded portion 11 of the optical eyepiece element 9. Pin 10 rides in the spiral groove determined by the screw threads on portion 11 and, upon rotation of the optional eyepiece element 9, causes axial displacement of the latter for focusing thereof. The rear wall 2 is provided with a transparent or translucent insert 12 disposed on the optical axis of the optical eyepiece element 9. The function of insert 12 will be defined later in relation to the operation of the viewer.

Supporting posts 13 are fixed to the inside surface of the sidewall 5 and are adapted to support a film cassette. Each post 13 has three sections of different diameters 14, 15, and 16, arranged in decreasing order from the foot to the head thereof, forming two circular shoulders.

A larger circular shoulder is formed between sections 14 and 15 and a smaller circular shoulder is formed between sections 15 and 16. In the embodiment shown in the drawings, there are four supporting posts 13.

A rectangular mounting plate 17, having one hole corresponding with each post 13, is fitted on said posts 13 such as to abut against the larger circular shoulder of said posts.

A magazine or cassette 18 is also of rectangular shape and provided with four holes 19 adjacent the corner thereof in order to be inserted and retained on sections 16 of each post 13, in engagement with the smaller circular shoulder thereof.

Microfilm cassette 18 comprises two sidewalls 20 and 21 held in spaced-apart relationship by spacer blocks 22 and 23. Spindles 24 and 25 are mounted inside the cassette 18 and project a predetermined distance outwardly of the exterior surface of sidewall 20. Gears 26 and 27 respectively are fixed on the projecting ends of said spindles in a common plane adjacent to sidewall 20.

A coil spring clutch is defined in combination with spindles 24 and 25. Closely wound coil springs 28 and 29 are inserted around said spindles 24 and 25 with at least some of their circumvolutions in sliding frictional contact with the respective spindles.

Cylindrical bushings 30 and 31 are coaxially mounted around spindles 24 and 25 and the respective springs 28, 29. One end of each spring is free while the other end is hooked to its corresponding bushing.

In one direction of rotation of the spindle, corresponding to the direction of the spring circumvolutions towards its free end, the spindle, spring and bushing combination rotates bodily, because the spindle causes radially inward coiling of the spring and consequently gripping of the latter on the spindle, while in the opposite direction the bushing freely rotates relative to its spindle because the spindle tends to produce radially outward opening of the spring circumvolutions.

As the two springs 28, 29 are wound in opposite direction, when one bushing freely rotates in one direction, the other bushing is locked to its spindle for rotation therewith and vice versa, whereby each axle is adapted to selectively wind and unwind the microfilm which is threaded on bushings 30 and 31 by insertion in a threading 32, as is well known in the art.

A circular recess 33 is provided inside wall 5. A hole 34 is bored centrally of said circular recess 33 through the remaining thickness of sidewall 5. A handwheel 35 is provided with a stud axle 36 fixed to one side and at the center of said handwheel 35.

Stud axle 36 projects through hole 34 and another hole bored through plate 17. A driving gear 37 is fixed at the free end of stud axle 36 between plate 17 and the film cassette 18. Driving gear 37 engages gears 26 and 27 mounted on the spindles 24 and 25. Rotation of the handwheel 35 causes rotation of gears 26 and 27 and driving of the film in one or the other direction.

Recesses 38 or ribs 39 are provided on the exposed surface of handwheel 35, the exposed surface being the surface opposite to the one from which the stud axle 36 projects. Recesses 38 are particularly adapted for fingertip operation of the handwheel 35.

The film cassette 18 further comprises a window determining a viewing station for the microfilm. Said window comprises a pair of spaced blocks 40 upstream and downstream of the viewing station.

A sponge rubber pad, or band 41, is located on one block of each pair such as to frictionally contact one face of the microfilm and hold it against the other block of each pair. A third block 42 is disposed rearwardly of each of said pair and in close relationship thereto, such as to determine a gap between each pair of blocks 40 and the corresponding third block 42.

An auxiliary translucent panel 43, adapted to diffuse light, is inserted in said gaps. A pair of pins or rolls 44 are provided further upstream and further downstream relative to the pair of blocks 40, pins or rolls 44 being provided, as is well known in the art, in order to guide the film indicated by 45.

An angular metal bracket 46 having a bent portion 47 is fixed inside the casing of the viewer at the top near the rear thereof.

A second metal bracket 48 is fixed to sidewall 5 on the inside surface thereof. Metal bracket 48 is of resilient material and has a bent portion 49 substantially parallel to the top 3 of the casing. The metal brackets 46 and 48 cooperate to form a holder for a battery 50. On the free end of bent portion 49 is formed a lamp socket portion 51 having an opening defining a socket for insertion of a light bulb 52. A metal spring plate 53 is fixed at one end to wall 5 such that the free end thereof is biased against the end terminal of light bulb 52, as best seen in FIG. 2.

An angular switch element 54 is fixed to sidewall 5 such that one portion 55 thereof extends adjacent to and convergent with bent portion 47 of angular metal bracket 46.

An electrical wire 56 connects switch element 54 to the spring plate 53 contacting the end terminal of light bulb 52.

A slot 57 is provided inside wall 5 and extends between portions 47 and 55, as seen in FIG. 1.

A metal pin 58 extends slidably through said slot 57 and is fixed to a switch button 59 riding up and down along said slot. When switch button 59 is up, metal pin 58 is at the top end of the slot and extends between bracket portions 47 and 55 without establishing electrical contact between the latter. When switch button 59 is moved down, metal pin 58 engages portions 47 and 55 and establishes electrical contact between the latter, thus switching on the light bulb 52 which provides artificial illumination behind the film portion seen in the window of the cassette through the optical eyepiece 9. For daylight illumination of the film, translucent plate 43 may be removed since no light diffusion is required. When the internal lighting is not used, the microfilm can nevertheless be seen if there is sufficient external or environmental lighting available. In such case, light enters through translucent insert 12 located on the optical axis of the eyepiece 9. Advance of the film is obtained by rotation of handwheel 35 which engages the cassette gears 26 and 27.

I claim:

1. A portable film viewer comprising a casing, an optical eyepiece mounted through an exterior wall of said casing, a film cassette removably mounted in said casing contiguous to said optical eyepiece, two film spool supporting bushings mounted in said cassette, a spindle for each bushing journaled in the cassette, coaxial with the bushing, extending therein and protruding outwardly of the cassette, a gear secured to the protruding end of each spindle, a handwheel rotatively mounted on said casing exteriorly thereof, an axle secured to said handwheel and projecting inwardly of said casing, a single driving gear fixed to the free inner end of said axle and located within said casing and adapted to removably mesh with both spindle gears to simultaneously rotate the latter in the same direction, and a unidirectional clutching device between each spindle and associated bushing, whereby rotation of said handwheel will cause selective rotation of said spindles in either one of two directions.

2. In a portable film viewer as claimed in claim 1, wherein said clutching device comprises a closely wound coil spring surrounding the associated spindle and located in the associated bushing, one end of the spring being free while the other end is hooked to the associated bushing, at least some of the circumvolutions of said spring being in sliding frictional contact with the associated spindle, whereby rotation of the spindle in one direction causes radially inward coiling of the spring and consequently gripping of the latter on the spindle and rotation of the spindle in the opposite direction tends to produce radially outward opening of the spring circumvolutions and release of the latter from the spindle.

3. In a portable film viewer as claimed in claim 2, wherein the two springs are wound in opposite directions towards their free end.